United States Patent
Kundert

(10) Patent No.: US 11,002,673 B2
(45) Date of Patent: May 11, 2021

(54) METHOD FOR MEASURING A CONCENTRATION OF A GAS

(71) Applicant: WILCO AG, Wohlen (CH)

(72) Inventor: Sandro Kundert, Zürich (CH)

(73) Assignee: WILCO AG, Wohlen (CH)

( * ) Notice: Subject to any disclaimer, the term of this patent is extended or adjusted under 35 U.S.C. 154(b) by 32 days.

(21) Appl. No.: 16/347,653

(22) PCT Filed: Nov. 1, 2017

(86) PCT No.: PCT/EP2017/077943
§ 371 (c)(1),
(2) Date: May 6, 2019

(87) PCT Pub. No.: WO2018/083107
PCT Pub. Date: May 11, 2018

(65) Prior Publication Data
US 2019/0317014 A1   Oct. 17, 2019

(30) Foreign Application Priority Data

Nov. 4, 2016   (CH) ..................... 01471/16

(51) Int. Cl.
*G01N 21/35*   (2014.01)
*G01N 21/03*   (2006.01)
(Continued)

(52) U.S. Cl.
CPC ......... *G01N 21/359* (2013.01); *G01N 21/031* (2013.01); *G01N 21/0303* (2013.01);
(Continued)

(58) Field of Classification Search
CPC ............ G01N 21/359; G01N 21/0303; G01N 21/031; G01N 21/1717; G01N 21/39;
(Continued)

(56) References Cited

U.S. PATENT DOCUMENTS 4,522,494 A * 6/1985 Bonner ................. G01N 21/51
356/338
5,728,439 A * 3/1998 Carlblom ............... C08G 59/50
428/36.91
(Continued)

FOREIGN PATENT DOCUMENTS

EP   1 927 831 A1   6/2008
JP   2009-014589 A   1/2009

OTHER PUBLICATIONS

Mar. 6, 2018 International Search Report issued in International Patent Application No. PCT/EP2017/077943.
(Continued)

*Primary Examiner* — Mark R Gaworecki
(74) *Attorney, Agent, or Firm* — Oliff PLC

(57) ABSTRACT

A method for measuring a concentration of a gas in a container having a wall with at least one deformable portion, the gas absorbing electromagnetic radiation at least in a specific spectral range, wherein the method includes the steps of biasing deformable portion and a further portion of wall opposite deformable portion between opposite positioning surfaces, thereby forming a biased volume of the container between the opposite positioning surfaces, during a measuring time, transmitting electromagnetic radiation into biased volume and receiving transmitted or reflected radiation of transmitted radiation from biased volume along respective radiation paths, relatively moving, during measuring time, at least one of deformable portion and of further portion and at least one of radiation paths, and determining concentration of said gas from the radiation received.

19 Claims, 4 Drawing Sheets

Figure 1:
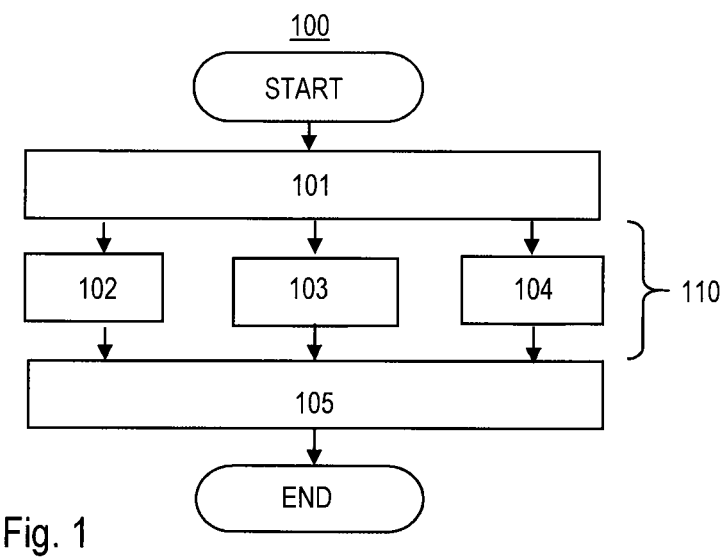

(51) Int. Cl.
*G01N 21/39* (2006.01)
*G01N 21/17* (2006.01)
*B65B 31/00* (2006.01)
*G01N 21/359* (2014.01)
*G01N 21/90* (2006.01)

(52) U.S. Cl.
CPC ......... *G01N 21/1717* (2013.01); *G01N 21/39* (2013.01); *B65B 31/00* (2013.01); *G01N 21/9081* (2013.01); *G01N 2021/0364* (2013.01)

(58) Field of Classification Search
CPC ....... G01N 21/9081; G01N 2021/0364; G01N 21/3504; G01N 21/9027; B65B 31/00
USPC .................................................... 250/339.06
See application file for complete search history.

(56) References Cited

U.S. PATENT DOCUMENTS

| | | | | |
|---|---|---|---|---|
| 5,908,789 | A * | 6/1999 | Weckstrom | G01N 21/3504 250/339.01 |
| 8,459,099 | B2 * | 6/2013 | Lehmann | G01M 3/3281 73/40 |
| 2004/0227087 | A1 * | 11/2004 | Markham | G01N 21/3504 250/339.08 |
| 2007/0256475 | A1 * | 11/2007 | Crane | G01N 29/036 73/24.01 |
| 2014/0029007 | A1 * | 1/2014 | Yokobayashi | G01N 21/90 356/437 |
| 2016/0169796 | A1 * | 6/2016 | Lewander Xu | G01N 21/61 356/437 |
| 2017/0269026 | A1 * | 9/2017 | Diekmann | G01N 27/4141 |
| 2018/0011011 | A1 * | 1/2018 | Foldes | G01N 33/18 |
| 2018/0059003 | A1 * | 3/2018 | Jourdainne | G01N 21/359 |

OTHER PUBLICATIONS

May 7, 2019 International Preliminary Report on Patentability issued in International Patent Application No. PCT/EP2017/077943.

* cited by examiner

METHOD FOR MEASURING A CONCENTRATION OF A GAS

The invention addressed herein relates to a method for measuring a concentration of a gas in a container having a wall with at least one deformable portion. Under further aspects, the invention relates to a method of producing a sealed container containing a filling gas volume having a concentration of a monitored gas lying in a predetermined concentration range and to an apparatus for performing the methods.

In several applications there are specific requirements to the composition of a gas present in a container for packaging sensitive contents, such as medicals or food. E.g. for process control or quality control there is a need to determine a concentration of a gas in a container before packaging, during packaging or after packaging. The relevant gas concentration may e.g. be the concentration of oxygen in case the content of the container may be oxidized and thereby undergo a degradation. Low oxygen concentration may suppress bacterial or fungal activity, as well.

As an example, infrared absorption spectroscopy is a known method, which is suitable to determine the concentration of specific monitored gases in a container and which allows determining a concentration of a gas in a non-invasive way, i.e. without the need of entering with a part of the measuring apparatus into the container. It is only infrared radiation that passes through the walls of the container and through the gas to be analyzed. The radiation intensity of the infrared radiation is reduced in absorption bands specific for different species of gas.

It is not uncommon to use containers having flexible or deformable walls for packaging sensitive products such as pharmaceuticals or food. Such containers may be bags, trays with a covering foil or containers being semi-rigid, e.g. containers having walls comprising plastic or cardboard. As the resulting absorption depends on the gas concentration and on the travelling distance of the radiation in the gas, the precise measurement of gas concentration in containers having deformable walls is difficult. Such containers may have a large variability between individual containers. In particular, if the process of filling content into such a container with deformable walls is not yet finished, the contents volume and with it several dimensions of the container may change from measurement to measurement or even during a single measurement, thus influencing the travelling distance of the radiation in the gas and therewith the absorbed amount of radiation.

The object of the present invention is to provide a method for measuring a concentration of a gas in a container having a wall with at least one deformable portion that eliminates some difficulties of the known methods.

This object is achieved by a method according to claim 1.

The method according to the invention is a method for measuring a concentration of a gas in a container having a wall with at least one deformable portion, the monitored gas absorbing electromagnetic radiation at least in a specific spectral range. The method comprises the steps of:
biasing the deformable portion and a further portion of the wall opposite said deformable portion between opposite positioning surfaces, thereby forming a biased volume of the container between said opposite positioning surfaces,
during a measuring time, transmitting electromagnetic radiation into the biased volume and receiving transmitted or reflected radiation of the transmitted radiation from the biased volume along respective radiation paths,
relatively moving, during the measuring time, at least one of the deformable portion and of the further portion and at least one of the radiation paths, and
determining the concentration of the gas from the radiation received The inventor has recognized that with this method gas concentrations of the gas can be measured with high precision. In particular, low concentrations of the monitored gas, leading only to weak absorption of the intensity can be determined with small error. By the relative movement of at least one of the deformable portion of the wall of the container or the further portion of the wall of the container relative to at least one of the radiation paths, disturbing effects that have their origin in reflections and scattering on material of portions of the wall that is traversed by the electromagnetic radiation, are averaged out. Successive measurements on the same container are more reproducible. Small variation in the exact form or surface structure of different containers of the same type have less influence on the gas concentration determined. The inventor has recognized that interference effects between various possible radiation paths may erroneously interpreted as absorption in a gas. This type of error becomes relevant when measuring low concentrations of a gas or when measuring with short radiation path length inside the gas. Interference effects may become severe when highly coherent electromagnetic radiation is applied, such as laser light. The method according to the invention effectively reduces this type of error.

With the step of biasing the deformable portion and a further portion of the wall opposite the deformable portion between opposite positioning surfaces, the contact to the positioning surfaces is established at two portions of the wall that lie opposite to each other with respect to the content volume of the container. With this, the length of the radiation path inside the content volume can be properly defined even for a container having highly flexible walls, as e.g. a bag for storing a liquid.

The step of biasing the deformable portion and a further portion of the wall opposite the deformable portion between opposite positioning surfaces may be performed in various ways. E.g. filling liquid into the container is a possible way to achieve the biasing.

It is of course assumed that the walls the container is at least partially transparent or translucent for the electromagnetic radiation in the specific spectral range used in the method.

In one embodiment of the method according to the invention, which may be combined with any of the embodiments still to be addressed unless in contradiction, the relatively moving is performed in a cyclic movement having a repetition time corresponding to the measuring time or to a fraction of the measuring time.

In a cyclic movement the positions of the moving objects are the same again after a repetition time or integer multiples of the repetition time. With this embodiment, all positions of the section of the wall in movement that are reached during a cycle of the movement contribute to the measurement. Effective averaging out of effects depending on the exact position of sections of the wall is achieved by this embodiment.

In one embodiment of the method according to the invention, which may be combined with any of the preaddressed embodiments and any of the embodiments still to be addressed unless in contradiction, the relatively moving is induced by acting on the wall of the container by means of a manipulating element.

The manipulating element may e.g. be used to push against the wall of the container or to pull some part of the wall of the container to induce a movement of at least one of the deformable portion or the further portion of the wall. The manipulating element may be a manipulating element used for handling the container in an automated way, e.g. for transporting the container between different stations of an automated filling system. The manipulating element may be configured to manipulate at least a part the wall of a container, once the container is inserted between the opposite positioning surfaces.

In one embodiment of the method according to the invention, which may be combined with any of the preaddressed embodiments and any of the embodiments still to be addressed unless in contradiction, the relatively moving is induced by moving a first positioning surface of the opposite positioning surfaces with respect to a second positioning surface of the opposite positioning surfaces, thereby holding the length of the radiation path substantially constant.

In this embodiment, the movement of the first positioning surface is effectively transmitted to a movement of at least one of the opposing portions of the wall. As the two positioning surfaces are moved relative to each other, different portions of the wall of the container may rearrange themselves in various positions relative to each other during the movement, leading to various configurations regarding to possible scattering ways of the radiation path across the container. The length of the radiation path is held substantially constant, thus only the unwanted effects are varied while holding the decisive path length of the radiation path constant. Possible movements holding the length of the radiation path substantially constant are for example a translation perpendicular to the radiation path, a rotation around an axis along the radiation path, or a tilting around a point defining the radiation path, such as a point on a reflector. Alternatively, microscopic translations parallel to the radiation hold the decisive path length of the radiation path substantially constant as well.

The relative movement of the positioning surfaces may be continuous or step-wise, e.g. with a time span without movement in each step.

In one embodiment of the method according to the invention, which may be combined with any of the preaddressed embodiments and any of the embodiments still to be addressed unless in contradiction, the step of determining the concentration is based on radiation received at points in time corresponding to different positions of at least one of the deformable portion and the further portion of the wall reached during the movement.

According to this embodiment, signal received, e.g. received by a detector in operative connection with an analog to digital converter, may be accumulated over time and the accumulated signal may be evaluated at the end of the measurement time. An alternative possibility is evaluating a series of measurements to produce a series of corresponding preliminary concentrations and calculating e.g. a mean value from the series of preliminary concentrations. The way of processing the signal according to this embodiment may be seen as a low pass filtering of signals received at the detector, whereby the signals having a frequency corresponding to the relatively moving is filtered out.

Depending on the embodiment in discussion, the position of at least one of the portions of the wall may be dependent on the position of the manipulating element or the position of the opposite positioning surfaces.

In one embodiment of the method according to the invention, which may be combined with any of the preaddressed embodiments and any of the embodiments still to be addressed unless in contradiction, the transmitting is performed by an electromagnetic radiation source, in particular a laser, having a spectral bandwidth narrower than the specific spectral range and with a tunable transmitter frequency and wherein the transmitter frequency is periodically swept over the specific spectral range.

A narrow band radiation source that may be applied in this embodiment of the method may e.g. be tunable diode laser. The sweeping of the frequency may in this case be performed by varying the driving current of the diode laser. Wavelength modulation techniques can be applied this way. The periodical sweeping may be performed with a repetition rate in the Hertz range. Superimposed to the periodical sweeping, a modulation of higher frequency, e.g. in the kilo Hertz range, may be applied. In the second case, signals having the modulation frequency and/or higher order sidebands of the modulation frequency may be accurately detected in the received signal, e.g. by means of a lock-in amplifier. By means of such wavelength modulation method, signals in the specific spectral range received, but stemming from disturbing sources, may be filtered out based on their frequency characteristic. Analysis of e.g. the intensity ratio between first order and second order sidebands may provide a possible way of measuring absorption related to a gas without knowing the absolute fraction of the radiation arriving at the detector.

In one embodiment of the method according to the invention, which may be combined with any of the preaddressed embodiments and any of the embodiments still to be addressed unless in contradiction, the step of biasing is performed by filling the container at least partially with a filling gas and thereby increasing a diameter of the container until the diameter extends between the opposite positioning surfaces.

This embodiments combines in an efficient way the filling of the container by a filling gas with the subsequent measurement of the concentration of a monitored gas. The concentration of the monitored gas species or unwanted gas species in the filled container may be higher than the concentration of this gas species present in the filling gas before its introduction into the container, as there may be residuals of the monitored gas in the container, adhere to the wall of the container or outgas from a liquid or solid content of the container.

In one embodiment of the method according to the invention, which may be combined with any of the preaddressed embodiments and any of the embodiments still to be addressed unless in contradiction, the step of biasing is performed by moving at least one of the opposing positioning surfaces towards at least one of the deformable portion and further portion of the wall.

This embodiment may e.g. used for measurement of a gas concentration in an already filled and sealed container, e.g. in the context of quality control.

Further in the scope of the invention lies a method of producing a sealed container containing a filling gas volume having a concentration of a monitored gas, in particular oxygen, lying in a predetermined concentration range, in particular a concentration below 100 ppm, in particular below 10 ppm, further in particular below 1 ppm, the method comprising:

a) providing a filling gas having a concentration of the monitored gas lying in the predetermined concentration range, b) at least once filling a container with the provided filling gas, c) applying the steps of the method according to the invention or any one of its embodiments to determine a concentration of the monitored gas, if the concentration lies outside the predetermined concentration range:

d) extracting at least a part of the provided filling gas from the container and repeating steps b) and c), or if the concentration lies in the predetermined concentration range:

e) sealing the container.

With this method, the packaging process and a quality control step are efficiently integrated. Sealed containers with a specified gas concentration may be prepared with this method as a preparation step for a packaging process. Container with sensitive contents may be produced by this method in a way assuring long shelf lives and integrity of the contents of the container.

Further in the scope of the invention lies a method of producing a sealed container containing a liquid or solid content and a filling gas volume having a concentration of a monitored gas, in particular oxygen, lying in a predetermined concentration range, in particular a concentration below 100 ppm, in particular below 10 ppm, further in particular below 1 ppm, the method comprising filling the liquid or solid content into the container followed by the method of producing a sealed container containing a filling gas volume having a concentration of a monitored gas as disclosed above.

The invention is further directed to an apparatus for performing the methods according to the invention or its embodiments. Such an apparatus comprises:

a first positioning surface and a second positioning surface of at least a first positioning element, the first and second positioning surfaces defining a space in between them;

a transmitter for electromagnetic radiation in the specific spectral range and a detector for electromagnetic radiation in the specific spectral range, the transmitter and the detector being arranged to define a radiation path traversing the space on the way from the transmitter to the detector;

an actuator element being mechanically coupled to a manipulating element configured to manipulate at least a part the wall of a container, once a container is inserted between the first and second positioning surfaces, thereby moving a section of the wall of the container relatively to at least one of the radiation paths and across at least one of the radiation paths, the section being adjacent to at least one of the first and second positioning surfaces;

a control unit operably connected to the transmitter, to the detector and to the actuator element;

an evaluation unit operably connected to the detector and configured to determine a gas concentration based on the electromagnetic radiation received by the detector.

The transmitter of electromagnetic radiation may be a laser, in particular a tunable diode laser. The detector may be a photodiode, in a particular a silicon photodiode. The electromagnetic radiation may be radiation in the near-infrared-range, in particular in a range around an absorption line of the monitored gas. In the case of oxygen being the monitored gas, the specific spectral range may be a range covering a few nanometers wavelength around 760 nanometer wavelength. Other spectral ranges, such as spectral ranges comprising absorption bands of water vapor, carbon dioxide, carbon monoxide, etc. may be selected.

Transmitter and/or detector may be connected to a transmitter head and a receiver head, respectively, by optical fibers. In this case, the optical fibers are part of the radiation path between the transmitter and the detector. The optical fibers do not contribute to the narrow band absorption of radiation typical for absorption of a gas.

Transmitter and detector, or transmitter head and receiver head, respectively, may be arranged on opposite positioning surfaces. Transmitter and detector, or transmitter head and receiver head, respectively, may be arranged on the same of the positioning surfaces and a reflector, such as a mirror, may be placed on the other of the positioning surfaces. By using a reflector being semi-reflective to the electromagnetic radiation in the specific spectral range on the side of the transmitter and the detector, or transmitter head and receiver head, respectively, and a fully reflective reflector on the opposite side, configuration with a radiation path leading several times, e.g. four or six times, along the diameter of the container are possible. Additional positioning surfaces, such as a third and a fourth positioning surface may be implemented. Additional positioning surfaces may be useful in defining a more complex radiation path, e.g. a radiation path crossing the container several times.

The space defined in between the positioning surfaces may be adapted to receive the deformable portion of the wall in between them. The deformable portion of the wall may delimit a variable content volume of the container. The manipulating element may be a manipulating element used for gripping the container or for handling the container in an automated way, e.g. for transporting the container between different stations of an automated filling system.

The manipulating element is configured to manipulate at least a part of the wall of the container in such a way that a section of the wall of the container is moved relatively to at least one of the radiation paths. The part of the wall, which is manipulated, may be distant from the section of the wall, which undergoes a movement relative to a radiation path. The movement of the section of the wall occurs across at least one of said radiation paths. The section of the wall is adjacent to at least one of the first and second positioning surfaces. The section of the wall may as well be adjacent to additional positioning surfaces, if there are any. The manipulating element may for example be configured to move a part of the wall of the container together with the transmitter for electromagnetic radiation, such that the radiation path emitted from the transmitter scans across the section of the wall laying opposite to the part of the wall of the container being moved. The manipulating element may, as another example, be configured to pull on a part of the wall directly neighboring the section of the wall undergoing a relative movement in relation to at least one of the radiation paths.

In one embodiment of the apparatus according to the invention, which may be combined with any of the preaddressed embodiments and any of the embodiments still to be addressed unless in contradiction, the first positioning surface is arranged on the manipulating element, the manipulating element being movable with respect to the second positioning surface, in particular being translatable and/or rotatable and/or pivotable with respect to the second positioning surface.

This embodiment enables an effective way of inducing the relatively moving of a portion of the wall and a radiation path.

In one embodiment of the apparatus according to the invention, which may be combined with any of the preaddressed embodiments and any of the embodiments still to be addressed unless in contradiction, the first and second positioning faces are flat and are arranged substantially parallel to each other.

In one embodiment of the apparatus according to the invention, which may be combined with any of the preaddressed embodiments and any of the embodiments still to be addressed unless in contradiction, the first positioning element is translatable parallel to the second positioning face.

This embodiment enables e.g. inducing a large movement of a portion of the wall perpendicular to the radiation path while keeping the length of the radiation path inside the container substantially constant.

In one embodiment of the apparatus according to the invention, which may be combined with any of the preaddressed embodiments and any of the embodiments still to be addressed unless in contradiction, at least one of the first and second positioning faces is rigidly connected to a reflector for the electromagnetic radiation.

The radiation path may be independent of the exact position of the reflector as the position of reflection point is not moved when moving the reflector in a direction perpendicular to an optical axis. A radiation path crossing at least twice the interior volume of the container is possible according to this embodiment.

In one embodiment of the apparatus according to the invention, which may be combined with any of the preaddressed embodiments and any of the embodiments still to be addressed unless in contradiction, the apparatus further comprises a gas-flow introducing device adapted to be connected to an opening of the container and being operable to inflate and deflate the container.

With this embodiment, filling the container with gas or flushing the container with gas are possible in the apparatus that performs the measurement of the concentration of a gas. Inflating the container may be applied in the biasing step of the method according to the invention.

The invention is further directed to a filling facility for filling containers, the containers having a wall delimiting an inner volume of the containers, the wall having at least one deformable portion, wherein the filling facility comprises an apparatus according to the invention or any of the embodiments of the apparatus.

The apparatus may be applied to perform a quality control or a process control step in an automatized filling facility configured to handle containers having walls with at least a deformable portion. The filling facility according to the invention leads to precise determination of gas concentration in containers, such as in flexible bags, for which determination of gas concentration is generally difficult.

Figure 2:
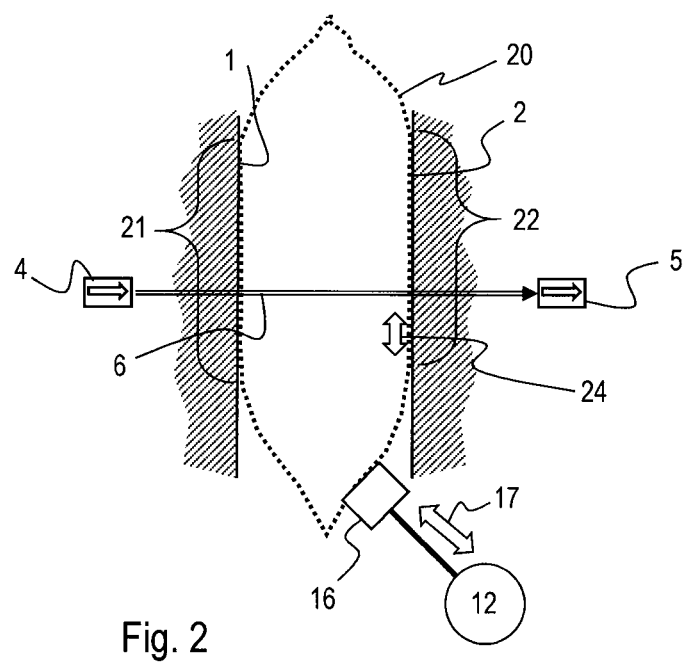
Figure 3:
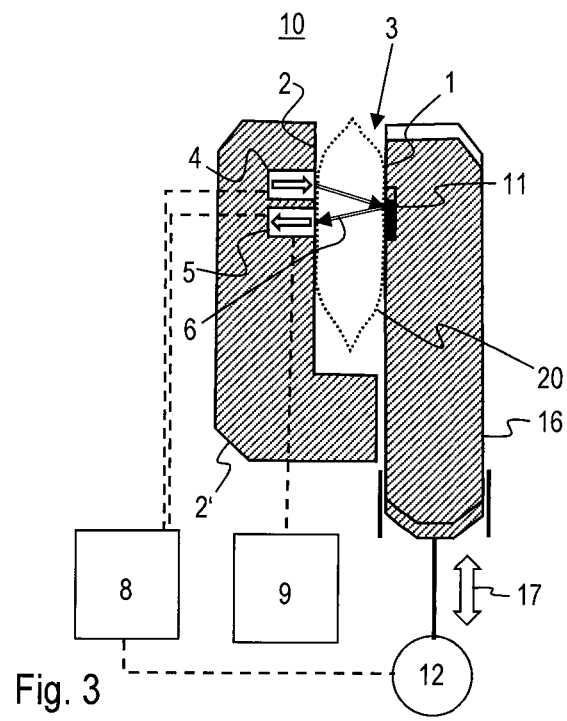
Figure 4:
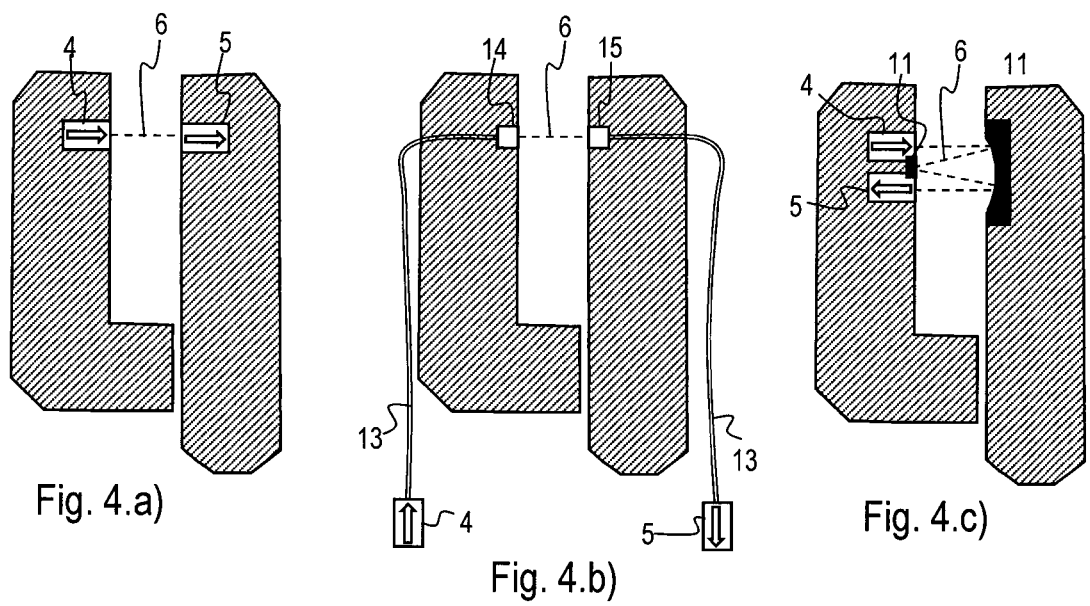
Figure 5:
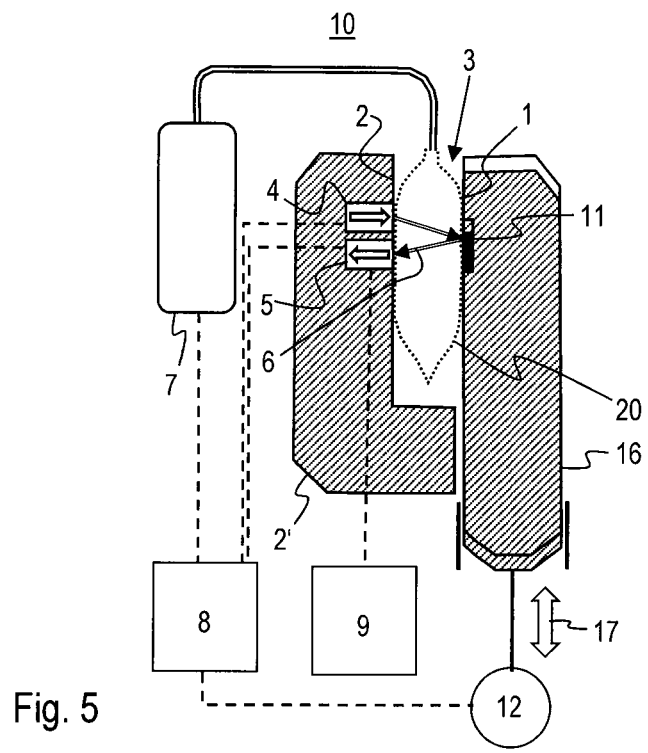
Figure 6:
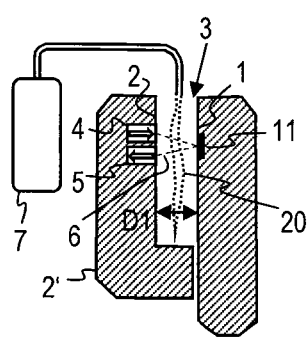
Figure 6:
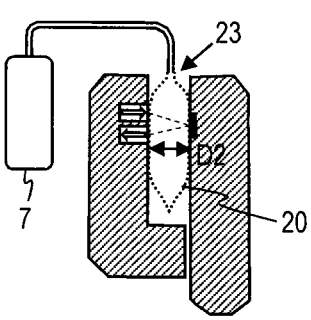
Figure 6:
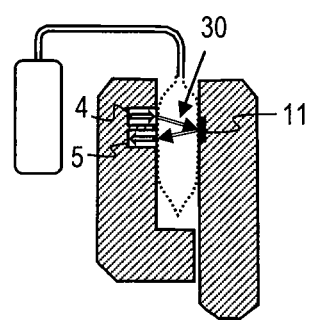
Figure 7:
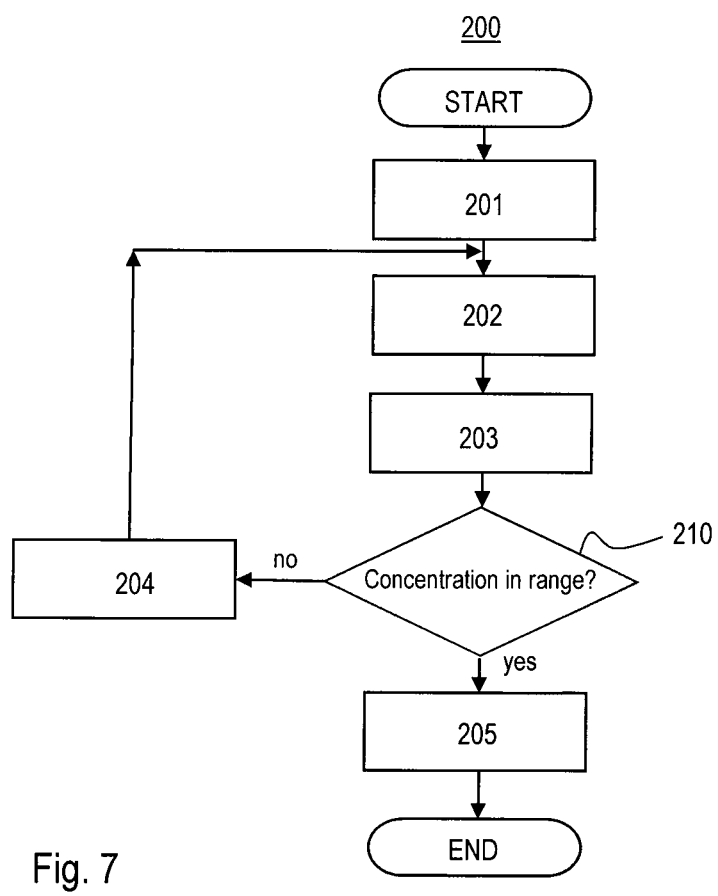

The invention shall now be further exemplified with the help of figures. The figures show:

FIG. 1 a flow chart of the method according to the invention;

FIG. 2 a schematic view of the situation occurring during the measuring time in the method according to the invention;

FIG. 3 a schematic view of an embodiment of an apparatus according to the invention;

FIG. 4.*a*) to 4.*c*) schematic views of different arrangements defining a radiation path;

FIG. 5 a schematic view of a further embodiment of an apparatus according to the invention;

FIG. 6.*a*) to 6.*c*) schematic views of the situation occurring in steps of an embodiment of the method according to the invention;

FIG. 7 a flow chart of the method of producing a sealed container containing a filling gas volume having a concentration of a monitored gas in a predetermined concentration range.

FIG. 1 shows, schematically and simplified, a flow chart of the method 100 according to the invention. The method 100 is a method for measuring a concentration of a gas in a container having a wall with at least one deformable portion. The gas absorbs electromagnetic radiation at least in a specific spectral range. First, the step of biasing 101 the deformable portion and a further portion of the wall opposite the deformable portion between opposite positioning surfaces is performed. Thereby a biased volume of the container between the opposite positioning surfaces is formed. During a measuring time 110, three processes are performed simultaneously. These processes are:

- transmitting 102 electromagnetic radiation into the biased volume,
- receiving 103 transmitted or reflected radiation of the transmitted radiation from the biased volume along respective radiation paths, and
- relatively moving 104 at least one of the deformable portion and of the further portion and at least one of the radiation paths.

The final step is the determination 105 of the concentration of the gas from the radiation received.

FIG. 2 shows, schematically and simplified, a view of the situation occurring during the measuring time in the method according to the invention. A radiation path 6 starts at a transmitter 4 for electromagnetic radiation and ends at a detector 5 for electromagnetic radiation. A first 1 and a second 2 opposite positioning faces define a volume for receiving at least a part of the container. Cross sections through elements that define the positioning faces are indicated by diagonal hatching, cross sections through the positioning faces are visible as lines in this figure. The positioning faces are arranged opposite to each other. A container 20 is placed between the first 1 and the second 2 positioning face. As result of previous steps of the method, the first section 21 of a wall of the container is in contact with the first positioning face. On the opposite side of the contents volume of the container 20, a second section 22 of a wall of the container is in contact with the second positioning face 2. This way, a section of the radiation path inside the container is properly defined. A manipulating element 16 is moved by means of an actuator element 12 against the wall of the container, as indicated by the double-arrow 17. This movement induces a movement—indicated by double-arrow 24—of a section of the wall of the container with respect to the radiation path.

FIG. 3 shows a schematic and partially cross-sectional view of an embodiment of an apparatus according to the invention. In this embodiment, the first positioning surface 1 is a surface of a manipulating element 16 and is movable parallel to the second positioning surface 2, which is a surface of a first positioning element 1'. A transmitter 4 and a detector 5 are arranged in fixed position with respect to the first positioning element 1'. The radiation path 6 is established from the transmitter 4 via a reflector 11 to the detector, thereby twice crossing the volume inside the container 20. The reflector 11 is movable together with the second positioning face 2. The movement of the reflector does not significantly change the length of the radiation path, as the movement occurs nearly perpendicular to the radiation path and the position of the reflection point on the reflector is not affected by the movement. An actuator element 12 is mechanically coupled to the manipulating element 16. The manipulating element is translatable in the direction indicated by double-arrow 17. A control unit 8 is operatively connected to the transmitter 4, the detector 5 and the actuator element 12, as indicated by dashed lines. An evaluation unit 9 is operatively connected to the detector 5. The situation during the measuring time is shown in this figure. Electromagnetic radiation follows the radiation path, as indicated by arrows and the manipulating element 16 is in movement, as indicated by two slightly displaced contours. This movement induces a slight movement at least in the section 22 of the wall of the container 20. The container 20 as shown here may e.g. be a bag made of plastic being sealed and containing a gas under over-pressure relative to its surrounding.

FIG. 4.a) to 4.c) show schematic views of different arrangements defining a radiation path. For ease of orientation, these arrangements are shown in relation to a simplified representation of the embodiment of the apparatus shown in FIG. 3, however, the arrangements may be combined with other embodiments as well.

FIG. 4.a) shows an arrangement of a transmitter 4 and a detector being arranged each in proximity of a first 1 and a second 2 positioning surface. A radiation path 6 once traverses the space between the first and second positioning surface in a direction perpendicular to the positioning surfaces.

In the arrangement in FIG. 4.b) a similar configuration as in 4.a) is shown. Here, the positions the transmitter and the detector are replaced by a transmitter head 14 and a receiver head 15. Transmitter 4 and detector 5 are placed at some distance and two optical fibers 13 connect each the transmitter 4 with the transmitter head 14 and the detector 5 with the receiver head 15, respectively.

FIG. 4.c) shows an arrangement comprising two mirrors 11 positioned on each of the opposing positioning surfaces 1, 2. Here, a radiation path 6 traverses the space in between the positioning surfaces four times on the way from the transmitter 4 to the detector 5.

FIG. 5 shows schematic view of a further embodiment of an apparatus 10 according to the invention. Compared to the embodiment shown in FIG. 3, the apparatus in addition comprises a gas-flow introducing device 7. The gas-flow introducing device is operable to inflate or deflate the container 20. Here, the situation during the measuring time is shown. As a preparing step, the container 20 having deformable walls has been inflated by means of the gas-flow introducing device 7, such that opposing walls of the container are in contact with the first 1 and second 2 positioning surface. With this embodiment of the apparatus, a gas concentration inside the container may be measured directly after introduction of the filling gas. A succession of inflating and deflating may be applied in order to flush the container with a filling gas, until a previously specified composition of the gas inside the container is reached. This composition may e.g. be a low oxygen concentration, such as an oxygen concentration below 1% or even below 100 ppm, in particular below 10 ppm, further in particular below 1 ppm.

FIGS. 6.a), 6.b) and 6.c) show schematic views of the situation occurring in steps of an embodiment of the method according to the invention. An empty container, which may have the form of a flexible bag, is arranged between opposing positioning surfaces 1, 2. The container 20 is connected to the gas-flow introducing device 7. In FIG. 6.b), the container is inflated by introducing gas through an opening 23 of the container. Thereby a diameter D2 of the container is increased until it coincides with the distance D1 between the first and second positioning surface, which is indicated in FIG. 6.a). FIG. 6.c) shows the situation during the measuring time, with electromagnetic radiation 30 being transmitted from the transmitter 4 via a reflection on the reflector 11 to the detector 5.

FIG. 7 shows a method 200 of producing a sealed container containing a filling gas volume having a concentration of a monitored gas, in particular oxygen, lying in a predetermined concentration range, in particular a concentration below 100 ppm, in particular below 10 ppm, further in particular below 1 ppm. The method comprises the sequence of steps:

a) providing 201 a filling gas having a concentration of the monitored gas lying in the predetermined concentration range, b) at least once filling 202 a container with the provided filling gas, c) applying 203 the steps of the method according to the invention or any one of its embodiments to determine a concentration of the monitored gas.

Then, depending on the determined concentration the decision 210 is made.

If the concentration lies outside the predetermined concentration range (arrow "no"), then the step d) extracting 204 at least a part of the provided filling gas from the container is performed and steps b) and c) are repeated to arrive at the decision 210 point again.

If the concentration lies in the predetermined concentration range (arrow "yes"), the step e) sealing 205 the container is performed.

As result, the sealed container fulfilling the predetermined requirements regarding the gas concentration of the monitored gas is produced.

LIST OF REFERENCE SIGNS 1 first positioning surface
1' first positioning element
2 second positioning surface
2' second positioning element
3 space between first and second positioning surface
4 transmitter
5 detector
6 radiation path
7 gas-flow introducing device
8 control unit
9 evaluation unit
10 apparatus
11 reflector
12 actuator element
13 optical fiber
14 transmitter head
15 receiver head
16 manipulating element
17 movement of manipulating element
20 container
21 first section of wall
22 second section of wall
23 opening
24 movement of section of wall
30 electromagnetic radiation
D1 distance (between first and second positioning face)
D2 diameter (of the container)
100 method (for measuring a concentration of a gas)
101, 102, 103, 104, 105 steps of the method
110 measuring time
200 method (of producing a sealed container)
201, 202, 203, 204, 205 steps of the method
210 decision

The invention claimed is:

1. A method for measuring a concentration of a gas in a container having a wall with at least one deformable portion, the gas absorbing electromagnetic radiation being at least in a specific spectral range, the method comprising:
    biasing the deformable portion and a further portion of the wall opposite the deformable portion between opposite positioning surfaces to form a biased volume of the container between the opposite positioning surfaces,
    during a measuring time, transmitting electromagnetic radiation into the biased volume and receiving transmitted or reflected radiation of the transmitted radiation from the biased volume along respective radiation paths,
    during the measuring time, moving: (i) at least one of the deformable portion and the further portion, and (ii) at least one of the radiation paths, and
    determining the concentration of the gas from the radiation received, wherein:
    the transmitting, the receiving and the moving are performed simultaneously,
    the moving is induced by moving a first positioning surface of the opposite positioning surfaces with respect to a second positioning surface of the opposite positioning surfaces to hold a length of the radiation path substantially constant, and
    the moving of the first positioning surface holding the length of the radiation path substantially constant includes one of:
        a translation perpendicular to the radiation path,
        a rotation around an axis along the radiation path, or
        a tilting around a point defining the radiation path.

2. The method according to claim 1, wherein the moving is performed in a cyclic movement having a repetition time corresponding to the measuring time or to a fraction of the measuring time.

3. The method according to claim 1, wherein the step of determining the concentration is based on radiation received at points in time corresponding to different positions of at least one of the deformable portion and the further portion of the wall reached during the movement.

4. The method according to claim 1, wherein
    the transmitting is performed by an electromagnetic radiation source including a laser that has a spectral bandwidth narrower than the specific spectral range and with a tunable transmitter frequency, and
    the transmitter frequency is periodically swept over the specific spectral range.

5. The method according to claim 1, wherein the step of biasing is performed by filling the container at least partially with a filling gas to increase a diameter of the container until the diameter extends between the opposite positioning surfaces.

6. The method according to claim 1, wherein the step of biasing is performed by moving at least one of the opposing positioning surfaces towards at least one of the deformable portion and further portion of the wall.

7. A method of producing a sealed container containing a filling gas volume having a concentration of a monitored gas including oxygen in a predetermined concentration range, the method comprising:
    a) providing a filling gas having a concentration of the monitored gas lying in the predetermined concentration range,
    b) at least once filling a container with the provided filling gas,
    c) applying the steps of the method according to claim 1 to determine a concentration of the monitored gas, wherein:
    if the concentration lies outside the predetermined concentration range:
        d) extracting at least a part of the provided filling gas from the container and repeating steps b) and c), or
    if the concentration lies in the predetermined concentration range:
        e) sealing the container.

8. A method for producing a sealed container containing a liquid or solid content and a filling gas volume having a concentration of a monitored gas including oxygen in a predetermined concentration range, the method comprising:
    filling the liquid or solid content into the container followed by the method according to claim 7.

9. The method according to claim 7, wherein the predetermined concentration range of oxygen is below 100 ppm.

10. The method according to claim 7, wherein the predetermined concentration range of oxygen is below 10 ppm.

11. The method according to claim 7, wherein the predetermined concentration range of oxygen is below 1 ppm.

12. The method according to claim 1, wherein the point defining the radiation path is provided on a reflector.

13. An apparatus for measuring a concentration of a gas in a container having a wall with at least one deformable portion, the gas absorbing electromagnetic radiation being at least in a specific spectral range, the apparatus comprising:
    a first positioning surface and a second positioning surface of at least a first positioning element, the first and second positioning surfaces defining a space in between the first and second positioning surfaces;
    a transmitter configured to transmit electromagnetic radiation in the specific spectral range and a detector configured to detect electromagnetic radiation in the specific spectral range, the transmitter and the detector being arranged to define a radiation path traversing the space on the way from the transmitter to the detector;
    an actuator mechanically coupled to a manipulating element that is configured to manipulate at least a part the wall of a container when the container is inserted between the first and second positioning surfaces to move a section of the wall of the container to at least one of the radiation paths and across at least one of the radiation paths, the section of the wall being adjacent to at least one of the first and second positioning surfaces;
    a control unit operably connected to the transmitter, to the detector and to the actuator;
    an evaluation unit operably connected to the detector and configured to determine a gas concentration based on the electromagnetic radiation received by the detector, wherein:
    the transmitting of the electromagnetic radiation, the detecting of the electromagnetic radiation, and the moving of the section are performed simultaneously,
    the moving of the section is induced by moving the first positioning surface with respect to the second positioning surface to hold a length of the radiation path substantially constant, and
    the moving of the first positioning surface holding the length of the radiation path substantially constant includes one of:
        a translation perpendicular to the radiation path,
        a rotation around an axis along the radiation path, or
        a tilting around a point defining the radiation path.

14. The apparatus according to claim 13, wherein the first and second positioning faces are flat and are arranged substantially parallel to each other.

15. The apparatus according to claim 14, wherein the first positioning element is translatable parallel to the second positioning face.

16. The apparatus according to claim 13, wherein at least one of the first and second positioning faces is rigidly connected to a reflector for the electromagnetic radiation.

17. The apparatus according to claim 13, further comprising:
- a gas-flow introducing device adapted to connect to an opening of the container and being operable to inflate and deflate the container.

18. A filling facility for filling containers, the container having wall delimiting an inner volume of the container, the wall having at least one deformable portion, the filling facility comprising:
- an apparatus according to claim 13.

19. The apparatus according to claim 13, wherein the point defining the radiation path is provided on a reflector.

* * * * *